V. W. Blanchard.
Blast Furnace.
N° 96,872. Patented Nov. 16, 1869.

Witnesses
John A. Ellis
J. V. White

Inventor
V. W. Blanchard
Per:
J. H. Alexander
Atty

United States Patent Office.

VIRGIL W. BLANCHARD, OF BRIDPORT, VERMONT.

Letters Patent No. 96,872, dated November 16, 1869; antedated November 6, 1869.

IMPROVED FURNACE AND PROCESS FOR TREATING AND REDUCING ORES, &c.

The Schedule referred to in these Letters Patent and making part of the same.

*To all whom it may concern:*

Be it known that I, VIRGIL W. BLANCHARD, of the town of Bridport, in the county of Addison, and State of Vermont, have invented certain new and useful Improvements in Furnaces, and the Process of Treating and Reducing Minerals; and that I do hereby declare that the following is a full, clear, and exact description thereof, reference being had to the accompanying drawings, and to the letters of reference marked thereon, which form a part of this specification, and in which—

Figure 1:
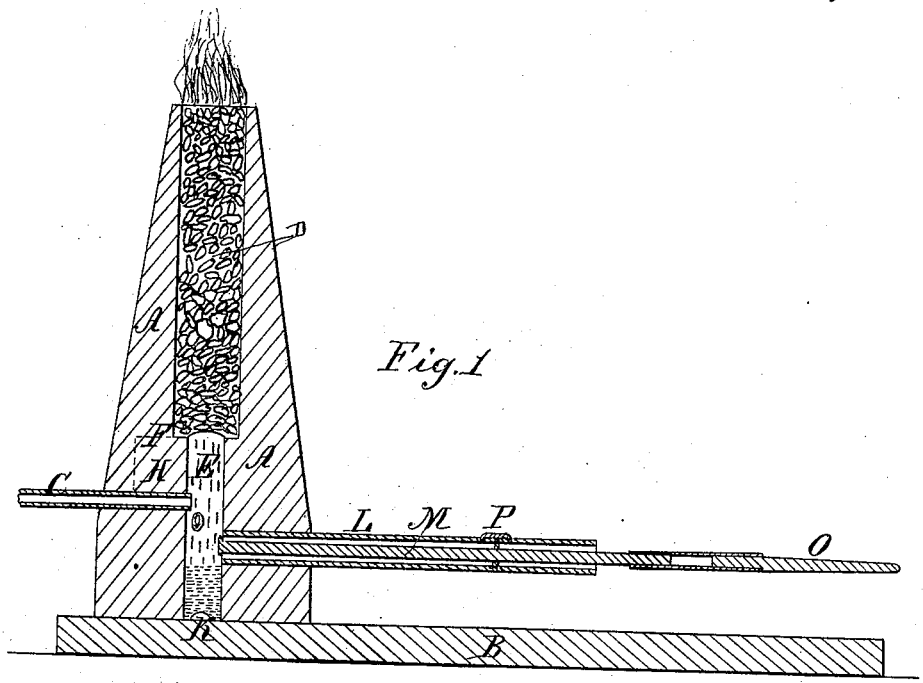

Figure 1 represents a longitudinal section, and

Figure 2:
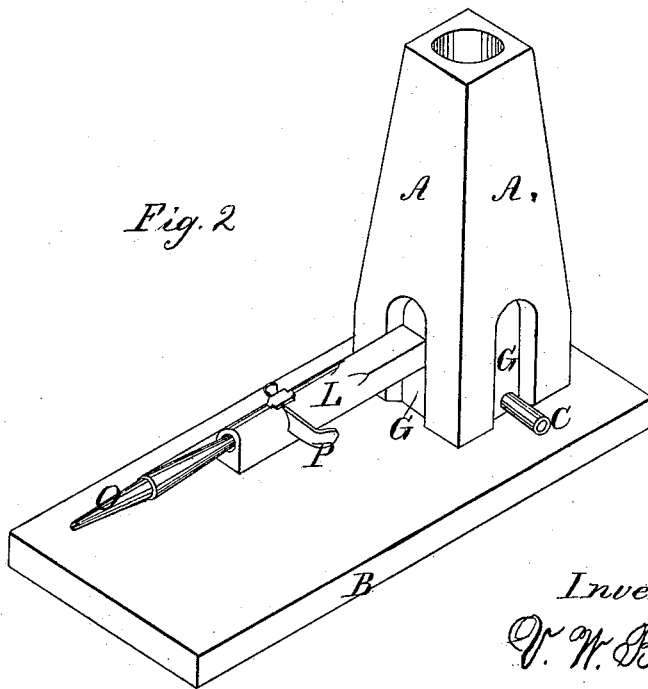

Figure 2, a perspective view of my furnace.

Similar letters indicate like parts in all the figures.

My invention relates to the introduction of iron-ore, or the ore of any other metal to which the process is applicable, in combination with prepared fuel and appropriate purifying-agents, into a funnel, at such a point as to be simultaneously and immediately exposed to the heat of the scoria and molten metal in its hearth; the heat of the scoria and molten metal, falling through the chamber into which they are introduced; the heat of the scoria, molten metal, melting ore, and burning fuel, directly above said chamber; the heat of the gaseous elements contained in the blast introduced, and to the chemical action of the gaseous elements contained in the said blast, by means of which fuel may be economized, and the molten metal decarbonized, or otherwise purified, as will be described.

My invention also consists in the introduction of a portion of the fuel used in the reduction of ore, into a chamber in a furnace, at a point at which it is simultaneously and immediately exposed to the heat of the scoria and molten metal in its hearth; the heat of the scoria and molten metal, falling through the chamber into which it is introduced; the heat of the scoria, &c., above said chamber; the heat of the gaseous elements contained in the blast introduced, and the direct chemical action of the gaseous elements contained in said blast, by means of which such fuel as coal-dust and coal-tar may be advantageously employed.

To enable others skilled in the art to which my invention appertains, to make and use the same, I will now describe its construction and operation.

In the accompanying drawings—

A represents an ordinary blast-furnace, mounted upon its foundation B.

C is a tube, passing through the wall of the furnace A, by means of which the gaseous elements contained in the blast are introduced into the interior of the same.

D represents the expanded cylindrical interior of the furnace A.

E represents the contracted cylindrical interior of the furnace A.

Let F represent the point where the expanded cylindrical interior of the furnace A joins the contracted cylindrical interior of the same.

G represents the hearth of the furnace.

H represents a chamber, occupying the interior contracted cylindrical space E of the furnace A, between the point F and that at which the blast-pipe C enters.

The point in the interior of the furnace at which the blast-pipe C enters, serves to divide the hearth G from the chamber H above it.

The expanded cylindrical space D, forming the upper portion of the interior of the furnace A, is of the same diameter from the top of said furnace to the point F, when the diameter of the interior of the furnace A becomes contracted, that the ore and fuel introduced at the top of the furnace continually form, in their descent, what is termed a "bridge;" that is, at that point they wedge together and form an arch, the molten metal and scoria alone descending through the chamber H to the hearth G.

K represents the port or opening at the bottom of the furnace A, through which the molten metal and scoria in its hearth may be drawn, when necessary.

As the fuel and ore do not descend into the contracted portion E of the interior of the furnace A, excepting in the form of molten metal and scoria, that above the surface of the molten metal and scoria in the hearth G, and that point F, in its interior, where expansion of its diameter takes place, is a chamber, H, in use.

This chamber is continually filled with the gaseous elements introduced through the pipe C, and that in this chamber the most intense heat is consequently maintained from the heat-blast, the molten metal and scoria in the hearth G, the molten metal and scoria falling through said chamber, and the molten metal, &c., in the expanded cylindrical space D above it.

L represents a tube, passing through the wall of the furnace A, and opening into the chamber H of the interior contracted space E.

This tube L extends a suitable distance outward over the foundation B.

M represents a rod, provided at one end with a head, N, fitting the calibre of the tube L, and at the other extremity with a handle, O, by means of which it may be operated.

The rod M, it will be seen, is of sufficient length, so that a ball or wad of any suitable material, placed in the outer extremity of the tube L, may be forced or injected through the whole length of said tube into the chamber H of the interior contracted space E of the frame A, by a person operating the handle O.

That portion of the extremity of the tube L, as well as the extremity of the blast-pipe C, which passes through the wall of the furnace A, and communicates with the interior contracted space E, should be surrounded with a coiled pipe, through which a stream of cold water may continually be forced, by means of which the extremity of said pipes may be kept cool to a proper degree.

P represents a slide, working laterally in the tube L, and by means of which said tube may be closed.

A sufficient portion of the slide P is cut away at Q, that when said slide is in a certain position, it will allow the head N of the rod M in the tube L.

By means of the slide P, it is evident that the opening, through the pipe L, into the chamber H of the furnace A, may be opened or closed at the pleasure of the operator.

Let No. 1 represent coal-tar;
No. 2, coal;
No. 3, iron-ore;
No. 4, a combination of coal-dust and coal-tar;
No. 5, a combination of iron-ore, coal-tar, and coal-dust; and
No. 6, chloride of sodium.

In the practical operation of my invention, fuel, ore, and slag-material, in sufficient quantity to fill the expanded cylindrical space D, are introduced at its top into the interior of the furnace A, the fuel kindled, and the blast applied.

The port or opening K and the tube L are then securely closed, the former with a plug of clay, and the latter by actuating the slide P.

After the furnace has become sufficiently heated to be in good running order, fuel, ore, and slag-material being regularly introduced, and the molten product withdrawn, in the manner common to all blast-furnaces, a ball or wad of sample No. 5 is introduced into the free extremity of the tube L, and by pressure against it, by means of the head N of the rod M, is forced toward the slide P in the tube L, by the handle O.

The tube L now being closed by the head N of the rod M, the slide P should now be actuated so as to allow a free passage, in the tube L, of the ball or wad, and the head N of the rod M, when, by means of its handle O, the slide, ball, or wad may be easily forced or injected, through the entire length of the tube L, into the chamber H in the interior of the furnace A.

The rod M should then be withdrawn, until its head N has passed the slide P.

The slide P should then be actuated so as to close the tube L, or the products of combustion will issue through the open extremity of said tube, from the interior of the furnace A, when the head N of the rod M is withdrawn from the tube L.

After the rod M has withdrawn from the tube L, another ball or wad of suitable material may be introduced into the open extremity of said tube, and, in the manner already described, injected into the chamber H of the furnace A.

By means of the injecting-apparatus just described, it becomes evident that any one of the kinds of fuel, Nos. 1, 2, 3, 4, 5, and 6, or any combination of them, may be easily injected into the chamber H.

By means of the injecting-apparatus just described, it also becomes evident that a sufficient quantity of fuel may be introduced into the chamber H and hearth G to melt a certain quantity of ore that may be introduced in a similar manner, either separately or in combination with it.

The relative amount of fuel, to a given quantity of ore, or the relative proportions of each, will depend upon circumstances, viz, the amount and force of the blast, the height and calibre of the exposed cylindrical portion of the furnace, and the quantity of the fuel and ore that is used.

The fuel that is injected, through the tube L, into the chamber H, in the manner described, is immediately exposed to the heat of the blast, the heat of the molten metal and scoria in the hearth G, the heat of the molten metal and scoria falling through the chamber H, the heat of the molten metal, scoria, &c., above said chamber, and to the direct action of the compound gaseous elements contained within said chamber.

By such means coal-tar and coal-dust may be employed in the reduction of ore to metal.

I do not limit my invention to the use of coal-tar, but include petroleum, or coal-oil, or any of its products; also, not to limit it to the use of coal-dust, but to include pulverized peat or any suitable substance.

The ore that is forced, through the tube L, into the chamber H, will fall directly upon the upper surface of the molten metal and scoria in the hearth G, when it will be surrounded by the intense heat of the molten metal below, and that resulting from the combustion of the injected fuel above, and the heat of the molten metal and scoria falling upon its upper surface, through the chamber H, from above.

In this condition for its reduction, it is evident that such ore will be immediately reduced to a molten state.

The molten metal in the hearth G that has been reduced in the expanded cylindrical space D, must, as in all ordinary blast-furnaces, contain a greater or less per cent. of carbon, the product being what is known as cast-iron.

Now, by the introduction of ore, in combination with a sufficient quantity of fuel, into the chamber H and hearth G, it becomes evident that the amount of carbon in a given quantity of the molten metal in the hearth G, will be diminished in proportion to the amount of ore thus introduced. Hence it follows that by the introduction or injection of a sufficient quantity of ore into the chamber H and hearth G, in the manner described, the percentage of carbon in the molten metal in the hearth G may be reduced so that the product will be steel or a high grade of malleable iron, as may be desired.

The ore may be heated to any desirable degree before it is introduced, in the manner described, into the chamber H, if, under certain conditions, such a course would be desirable.

In such a case the heated ore would be injected into the chamber H separately from the fuel.

By the addition of sample No. 6, in proper proportions, to the wad or ball injected into the chamber H, in the manner described, deleterious elements may be neutralized, which would otherwise appear in and injure the product.

Having thus described my invention,
What I claim as new, and desire to secure by Letters Patent, is—

1. The tube L and rod M, in combination with the furnace and blast-pipe C, substantially as and for the purpose specified.

2. The injection of prepared fuel and ore into the interior of a furnace, at such a point as to be exposed simultaneously to the heat of the molten metal in the hearth of the furnace and to the action of the gaseous elements contained in the blast, substantially as and in the manner set forth.

3. The tube L and rod M, constructed as described, in combination with the chamber H, substantially as and in the manner described.

4. The injection of coal-oil or coal-tar, in combination with the ore, into a furnace, at or near the point where the blast is applied, substantially in the manner and for the purpose specified.

5. The injection of coal-oil or pulverized coal, or any other suitable substance, into the interior of a furnace, at or near the point where the blast is applied, substantially as and in the manner specified.

6. The injection of iron-ore, in combination with prepared fuel and the chloride of sodium, or any other suitable substance, into the interior of a furnace, at or near the point where the blast is applied, substantially as and in the manner set forth.

7. The injection of prepared fuel into the interior of a blast-furnace, at or near the point where the blast is applied, substantially as and for the purpose specified.

8. The slide P and rod M, or their equivalents, in combination with the injecting-tube L, as and for the purpose set forth.

9. The injecting-tube L, constructed as described, in combination with the blast-pipe C, substantially as and in the manner specified.

In testimony that I claim the foregoing as my own, I affix my signature, in presence of two witnesses.

VIRGIL W. BLANCHARD.

Witnesses:
E. G. BLAISDELL,
LUTHER SMITH.